UNITED STATES PATENT OFFICE.

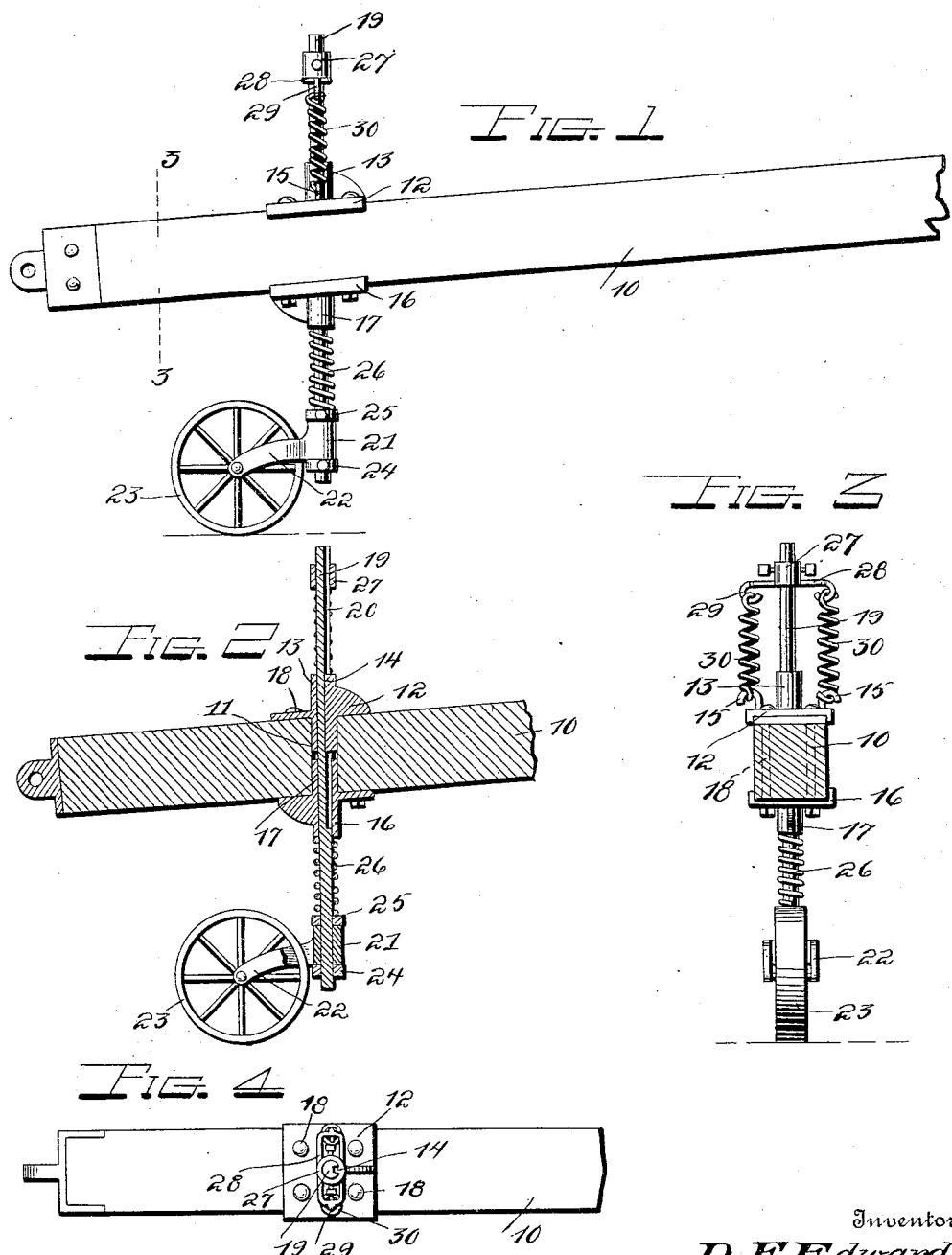

DARSIE E. EDWARDS, OF CLINTON, MISSOURI.

POLE-TRUCK.

1,048,951.

Specification of Letters Patent.   Patented Dec. 31, 1912.

Application filed April 4, 1912. Serial No. 688,536.

*To all whom it may concern:*

Be it known that I, DARSIE E. EDWARDS, a citizen of the United States, residing at Clinton, in the county of Henry, State of Missouri, have invented certain new and useful Improvements in Pole-Trucks; and I do hereby declare the following to be a full, clear, and exact description of the invention, such as will enable others skilled in the art to which it appertains, to make and use the same.

This invention relates to pole trucks and particularly that type adapted for use in connection with the pole of harvester binders and similar agricultural machines.

The object of the invention resides in the provision of a pole truck of the character referred to which will permit a free turning movement of the associated machine and which will yieldingly support the tongue of such machine for a limited up and down movement.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1 is a side elevation of the forward end of a pole or tongue of an agricultural machine with the improved truck associated therewith, Fig. 2, a vertical longitudinal section of what is shown in Fig. 1, Fig. 3, a section on the line 3—3 of Fig. 1, and Fig. 4, a plan view of what is shown in Fig. 1.

Referring to the drawings 10 indicates the forward end of the pole of an agricultural machine. This pole has formed therethrough a vertically directed transverse passage 11. Mounted upon the upper face of the pole 10 and partially embracing the sides of the latter is a plate 12. This plate 12 has formed integral therewith a tubular portion 13 the lower end of which is disposed in the upper end of the passage 11, while the upper end of said portion 13 projects above the outer face of the plate 12 and has its inner wall provided with a longitudinally extending rib 14. Suitably mounted on the upper face of the plate 12 on diametrically opposite sides of the portion 13 are hooks 15 for a purpose that will hereinafter appear. Disposed against the lower face of the tongue 10 is a plate 16 which also has formed integral therewith a tubular portion 17 the upper end of which is disposed in the passage 11, while the lower end thereof depends from said plate 16. The plates 12 and 16 are secured to the tongue 10 by means of common tie members 18 extending through said tongue and engaging at opposite ends the plates 12 and 16 respectively. Extending through the tubular portions 13 and 17 is a rod 19 provided at its upper end with a longitudinal groove 20 in which is disposed the rib 14 of the tubular portion 13, such engagement between said rib and groove serving to hold the rod against rotation but at the same time permitting a limited up and down movement of said rod in said tubular portion. Rotatably mounted upon the lower end of the rod 19 is a sleeve 21 provided with laterally directed ears 22 between which latter is journaled a traction wheel 23. Mounted upon the rod 19 beneath the sleeve 21 is a collar 24, while a similar collar 25 is mounted upon the rod 19 above the sleeve 21. Encircling the rod 19 and having its lower end in engagement with the collar 25 and its upper end in engagement with the lower end of the tubular portion 17 is a spring 26 which yieldingly supports the tongue 10 as will be apparent. Secured to the upper end of the rod 19 is a collar 27 provided with oppositely disposed lateral arms 28 which terminate respectively in downwardly directed hooks 29. Suspended from each of the hooks 29 is a spring 30 the lower end of which engages the adjacent hook 15 on the plate 12. By this arrangement of the springs 30 it will be apparent that the tongue 10 is not only yieldingly supported by the spring 26 but is also yieldingly suspended through the instrumentality of the springs 30.

What is claimed is:

1. The combination with a tongue having a transverse vertical passage therethrough, a plate disposed upon the upper face of said tongue having an integral tubular portion, the lower end of which is disposed in said passage, a plate disposed upon the lower face of said tongue having an inner tubular portion the upper end of which is disposed in said passage, a common means securing said plates to the tongue, a rod slidably and non-rotatably mounted in the tubular portions of said plates, a sleeve rotatable on the lower end of said rod, a fork on said sleeve, a wheel journaled in said fork, collars fixed on the rod above and below the sleeve, a spring encircling the rod and having one end in engagement with the plate disposed against the lower face of the tongue and its other end in engagement with the collar above the sleeve, whereby said tongue is yieldingly supported, radial arms fixed on the upper end of the rod, and springs secured to each of said arms and connected to the plate disposed against the upper face of the tongue for supporting said tongue in suspension.

2. The combination with a tongue having a transverse vertical passage therethrough, a rod slidably and non-rotatably mounted in said passage, a sleeve rotatable on the lower end of said rod, a fork on said sleeve, a wheel journaled in said fork, collars fixed on the rod above and below the sleeve, a spring encircling the rod between the collar above the sleeve and the tongue whereby the latter is yieldingly supported, radial arms fixed on the upper end of the rod and springs secured to each of said arms and connected to the tongue for supporting same in suspension.

In testimony whereof, I affix my signature, in presence of two witnesses.

DARSIE E. EDWARDS.

Witnesses:
R. F. EDWARDS,
G. L. ALLEN.

---

Copies of this patent may be obtained for five cents each, by addressing the "Commissioner of Patents, Washington, D. C."